United States Patent
Clonts et al.

(10) Patent No.: US 9,366,769 B2
(45) Date of Patent: Jun. 14, 2016

(54) NEUTRON CAMERA EMPLOYING ROW AND COLUMN SUMMATIONS

(71) Applicant: UT-Battelle, LLC, Oak Ridge, TN (US)

(72) Inventors: Lloyd G. Clonts, Knoxville, TN (US); Yacouba Diawara, Oak Ridge, TN (US); Cornelius Donahue, Jr., Knoxville, TN (US); Christopher A. Montcalm, Oak Ridge, TN (US); Richard A. Riedel, Knoxville, TN (US); Theodore Visscher, Powell, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 66 days.

(21) Appl. No.: 14/376,018

(22) PCT Filed: Jan. 15, 2013

(86) PCT No.: PCT/US2013/021541
§ 371 (c)(1),
(2) Date: Jul. 31, 2014

(87) PCT Pub. No.: WO2013/115975
PCT Pub. Date: Aug. 8, 2013

(65) Prior Publication Data
US 2014/0353511 A1 Dec. 4, 2014

Related U.S. Application Data

(60) Provisional application No. 61/592,785, filed on Jan. 31, 2012.

(51) Int. Cl.
*G01T 3/06* (2006.01)
(52) U.S. Cl.
CPC ............................... *G01T 3/06* (2013.01)

(58) Field of Classification Search
CPC .......................................................... G01T 3/06
See application file for complete search history.

(56) References Cited

U.S. PATENT DOCUMENTS

| | | | |
|---|---|---|---|
| 4,593,198 A | * | 6/1986 | Pang ..................... G01T 1/1642 250/363.02 |
| 4,814,623 A | | 3/1989 | Robertson et al. |

(Continued)

FOREIGN PATENT DOCUMENTS

| | | |
|---|---|---|
| CN | 1202251 A | 12/1998 |
| CN | 1203668 A | 12/1998 |

(Continued)

OTHER PUBLICATIONS

International Search Report dated Apr. 11, 2013 issued in PCT/US2013/021541.

(Continued)

*Primary Examiner* — Christine Sung
(74) *Attorney, Agent, or Firm* — Scully, Scott, Murphy & Presser, P.C.

(57) ABSTRACT

For each photomultiplier tube in an Anger camera, an R×S array of preamplifiers is provided to detect electrons generated within the photomultiplier tube. The outputs of the preamplifiers are digitized to measure the magnitude of the signals from each preamplifier. For each photomultiplier tube, a corresponding summation circuitry including R row summation circuits and S column summation circuits numerically add the magnitudes of the signals from preamplifiers for each row and for each column to generate histograms. For a P×Q array of photomultiplier tubes, P×Q summation circuitries generate P×Q row histograms including R entries and P×Q column histograms including S entries. The total set of histograms include P×Q×(R+S) entries, which can be analyzed by a position calculation circuit to determine the locations of events (detection of a neutron).

19 Claims, 6 Drawing Sheets

(56) References Cited

U.S. PATENT DOCUMENTS

| | | | |
|---|---|---|---|
| 4,881,171 A | 11/1989 | Jatteau et al. | |
| 5,289,510 A | 2/1994 | Mihalczo | |
| 5,504,334 A * | 4/1996 | Jansen | G01T 1/1642 250/366 |
| 6,180,946 B1 | 1/2001 | Ebstein | |
| 6,791,090 B2 * | 9/2004 | Lin | G01T 1/242 250/336.1 |
| 7,741,613 B1 | 6/2010 | Mascarenhas et al. | |

FOREIGN PATENT DOCUMENTS

| | | |
|---|---|---|
| CN | 1444733 A | 9/2003 |
| CN | 101539630 A | 9/2009 |
| CN | 101680953 A | 3/2010 |
| EP | 0 437 051 A2 | 7/1991 |
| RU | 2076339 C1 | 3/1997 |

OTHER PUBLICATIONS

Chinese Office Action dated Dec. 4, 2015 from related Chinese Patent Application No. 201380013799.1, together with an English language translation.

* cited by examiner

NEUTRON CAMERA EMPLOYING ROW AND COLUMN SUMMATIONS

RELATED APPLICATIONS

This application claims the benefit of priority of the U.S. provisional application 61/592,785 filed on Jan. 31, 2012.

STATEMENT REGARDING FEDERALLY SPONSORED RESEARCH OR DEVELOPMENT

This invention was made with government support under Contract No. DE-AC05-00OR22725 awarded by the U.S. Department of Energy. The government has certain rights in this invention.

FIELD OF THE INVENTION

The present invention relates to neutron detectors, and particularly to a neutron camera employing row and column summation algorithms for event location identification, and methods of operating the same.

BACKGROUND OF THE INVENTION

An Anger camera is a type of a neutron camera. A "head" of an Anger camera includes a flat scintillator plate optically coupled to an array of photomultiplier tubes (PMT). The head is mounted on a frame. The front end and back end electronics are mounted behind the PMT's, and are connected to a computer system that controls the operation of the camera as well as acquisition and storage of acquired images.

The Anger camera analyzes the light distribution pattern from a scintillating material to determine the position of particle captured in the scintillator. The light is emitted by the scintillator. Photomultiplier tubes (PMT's) behind the crystal detect the fluorescent flashes (events). A computer counts the number of events. This detection system is also widely called a gamma camera since the early applications were mainly for gamma detection.

SUMMARY OF THE INVENTION

For each photomultiplier tube in an Anger camera, an R×S array of preamplifiers is provided to detect electrons generated within the photomultiplier tube. The outputs of the preamplifiers are digitized to measure the magnitude of the signals from each preamplifier. For each photomultiplier tube, a corresponding summation circuitry including R row summation circuits and S column summation circuits numerically add the magnitudes of the signals from preamplifiers for each row and for each column to generate histograms. For a P×Q array of photomultiplier tubes, P×Q summation circuitries generate P×Q row histograms including R entries and P×Q column histograms including S entries. The total set of histograms include P×Q×(R+S) entries, which can be analyzed by a position calculation circuit to determine the locations of events (detection of a neutron).

According to an aspect of the present disclosure, a neutron camera is provided. The neutron camera includes a scintillator plate and at least one detector unit. Each of the at least one detector unit includes a photomultiplier tube located on a back side of the scintillator plate and including an R×S matrix of outputs. R and S are integers greater than 1. Each of the at least one detector unit further includes an R×S array of preamplifiers configured to amplify each output from the R×S matrix of outputs and to generate R×S amplified signals, and a signal conversion circuitry configured to generate a set of R row summation signals and a set of S column summation signals from the R×S amplified signals. The neutron camera further includes a position calculation unit configured to analyze a distribution of first time-integrated sums derived from the at least one set of R row summation signals and a distribution of second time-integrated sums derived from the at least one set of S column summation signals to identify an event location in the at least one scintillator plate at which a neutron causes scintillation.

According to another aspect of the present disclosure, a method of operating a neutron camera is provided. A neutron camera including a scintillator plate and at least one detector unit is provided. Each of the at least one detector unit includes a photomultiplier tube located on a back side of the scintillator plate and including an R×S matrix of outputs, and an R×S array of preamplifiers configured to amplify each output from the R×S matrix of outputs and to generate R×S amplified signals. R and S are integers greater than 1. For each of the at least one detector unit, a row signal histogram of R row summation signals and a column signal histogram of S column summation signals are generated. Each of the row summation signals is proportional to a sum of all outputs from a corresponding row within the R×S matrix of outputs, and each of the S column summation signals is proportional to a sum of all outputs from a corresponding column within the R×S matrix of outputs. An event location in the at least one scintillator plate at which a neutron causes scintillation can be determined by analyzing a time-integrated sum of each of the at least one row signal histogram and a time-integrated sum each of the at least one column signal histogram.

DETAILED DESCRIPTION OF THE INVENTION

Figure 1:
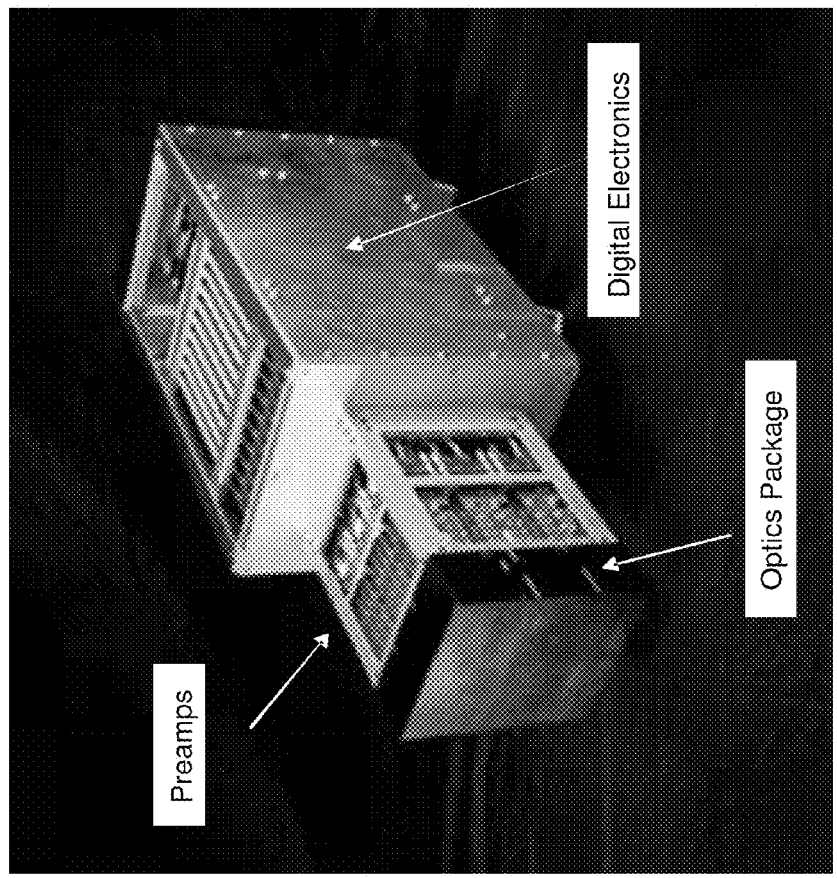
FIG. 1 shows a complete Anger Camera assembly according to an embodiment of the present disclosure.

As stated above, the present invention relates to a neutron camera employing row and column summation algorithms for event location identification, and methods of operating the same, which are now described in detail with accompanying figures. Like and corresponding elements are referred to by like reference numerals. Proportions of various elements in the accompanying figures are not drawn to scale to enable clear illustration of elements having smaller dimensions relative to other elements having larger dimensions.

An Anger camera of the present disclosure employs signal processing techniques that enhance the signal processing speed for identification of an event location at which a particle is detected. The Anger camera of the present disclosure retains desirable performance characteristics of $He^3$ detectors known in the art while offering lower parallax errors and better uniformity at reduced cost. The Anger camera of the present disclosure can be employed for neutron scattering applications and for other charged particle detection applications.

FIG. 1 is an annotated photograph of an Anger camera according to an embodiment of the present disclosure. The Anger camera includes three major modules. The first module is an optics package. The second module is a preamplifier module. The third module is a digital electronics module that provides analog-to-digital (A/D) conversion and position calculation.

The Anger camera can be divided into a P×Q array of detector units, a subset of the first module that includes a scintillator plate and a glass spacer, and a subset of the third module that includes a position calculation unit. Each of P and Q can an integer greater than 1. For example, P and Q can be in a range from 2 to 20, although greater numbers can also be employed. In one embodiment, the P×Q array of detector units is a square array, i.e., an array in which P is equal to Q. The P×Q array of detector units. The P×Q array of detector units includes another subset of the first module that contains a P×Q array of photomultiplier tubes (PMT's), the second module that includes a P×Q array of preamplifier units, and another subset of the third module that includes a P×Q array of A/D conversion units. Each detector unit includes a PMT (which is a component of the first module), a preamplifier unit (which is a component of the second module), and an A/D conversion unit (which is a component of the third module).

The scintillator plate triggers scintillation upon interaction with a neutron, i.e., upon a neutron capture event. The P×Q array of detectors generate electronic signals employing photons generated at the scintillator and captured and amplified in the PMT's. Position calculation can be performed by a position calculation unit in the third module, which receives data from the P×Q array of detector units and processes the data to identify an event location at which a particle is detected.

Figure 2:
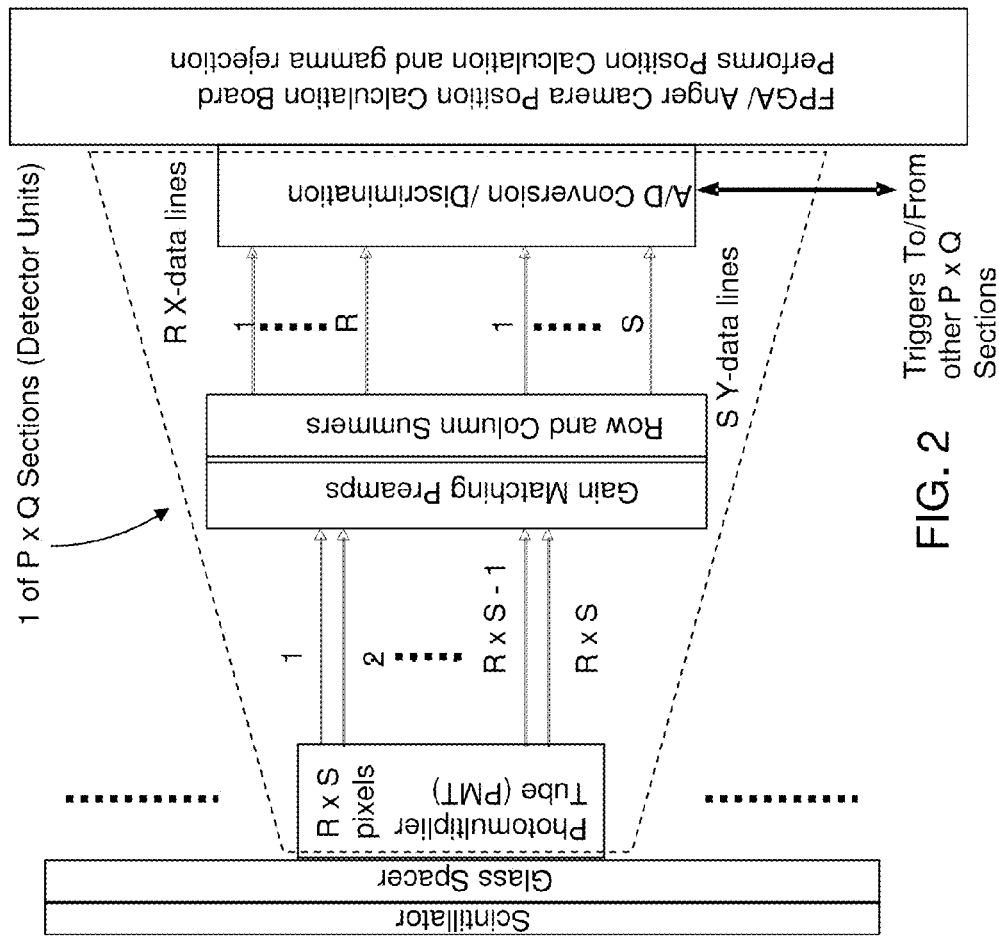
FIG. 2 is a signal flow schematic of an Anger camera according to an embodiment of the present disclosure.

Referring to FIG. 2, a signal flow schematic of an Anger camera according to an embodiment of the present disclosure is shown. A detector unit among a P×Q array of detector units is shown along with a scintillator plate and a glass spacer within the first module and the position calculation unit within the third module.

The first module of the Anger camera includes a scintillator plate, a glass spacer, and a P×Q array of photomultiplier tubes (PMT's). The scintillator plate can include any material that can capture neutron and cause scintillation upon a neutron capture. For example, the scintillator plate can include a silicate glass plate having lithium and cerium as dopants. The thickness of the scintillator plate can be from 1.5 mm to 2.0 mm, although lesser and greater thicknesses can also be employed. The scintillator plate is typically optically transparent, i.e., transmits light in the wavelength range from 400 nm to 800 nm without any appreciable absorption.

The glass spacer is a transparent glass plate that is placed between the scintillator plate and the PMT's. In one embodiment, the scintillator plate may be coated on the surface opposite of the glass spacer. The thickness of the glass spacer may be in a range from 2 mm to 5 mm, although lesser and greater thicknesses can also be employed. In an illustrative example, the scintillator can include BC-620 diffused reflector material. Optionally, the scintillator plate may be optically coupled to the glass spacer by using an index-matching material to reduce reflection at the interface.

The glass spacer is optically coupled to the P×Q array of PMT's. The PMT's can be of any type known in the art. In one embodiment, the PMT's in the P×Q array of PMT's can have a rectangular shape so that physical gaps between sides of the PMT's can be minimized.

Figure 3:
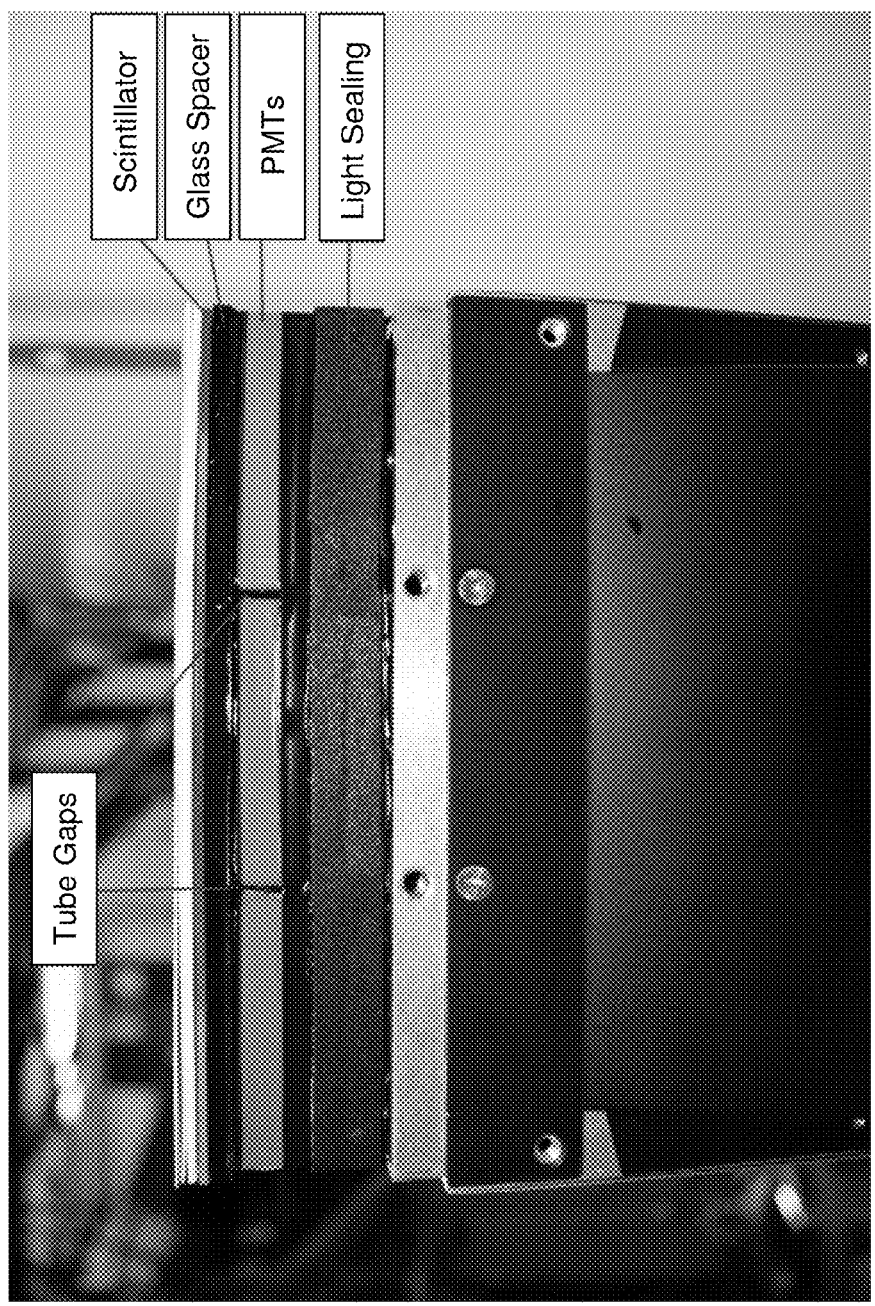
FIG. 3 is a cross-sectional view of an optics package of an Anger Camera according to an embodiment of the present disclosure.

The scintillator plate, the glass spacer, and the P×Q array of PMT's are assembled together to form the first module. FIG. 3 illustrates an exemplary arrangement of the scintillator plate, the glass spacer, and the P×Q array of PMT's for the case in which P=Q=3. Each PMT is located on the back side of the glass spacer, and the scintillator plate is located on the front side of the glass spacer. A light sealing device surrounds the interface between the first module and the second module in order to minimize noise due to external light.

Referring back to FIG. 2, each PMT can include R×S pixels. In this case, each PMT includes an R×S matrix of outputs. Each output of the PMT corresponds to a single pixel within the PMT. R and S are integers greater than 1. In one embodiment, each of R and S can be in a range from 4 to 128.

The P×Q array of PMT's can be mounted to a frame for structural support. A mounting system for fixing physical locations of the PMT's relative to the frame can be employed. In one embodiment, a mounting system employing pin tipped set screws can be employed to locate the PMT's to a tolerance less than 0.1 mm for the P×Q array. The mounting system can optionally employ spring tipped set screws to provide pressure to keep the PMT's coupled to the glass spacer and the scintillator plate.

In one embodiment, outside light can be blocked out from the P×Q array of PMT's, the scintillator plate, and the glass spacer by a closed cell foam tape placed around the perimeter and the base of the PMT's. In addition, a base tape may be employed to block light from impinging on the first module due to any variance in thickness between the PMT's and a bezel for placing the PMT's. The thickness of the closed cell foam tape and the base tape can be selected as needed, and can be in a range from 132 of an inch to 18 of an inch (0.794 mm to 3.175 mm). Further, a non-adhesive foam may be used to provide light-sealing among the PMT's.

Within the optics package, optical coupling between the glass spacer and the P×Q array of PMT's may be provided employing an optical gel cookie, which allows replacement of individual PMT's in case of a failure of any PMT. The thickness of the optical gel cookie can be from 0.25 mm to 2.0 mm, although lesser and greater thicknesses can also be employed.

The preamplifier module includes a P×Q array of preamplifier packages. Each preamplifier package includes an R×S array of preamplifiers that are configured to compensate for the differences in gain of the R×S cells of the corresponding PMT. In one embodiment, the preamplifiers may be transimpedance amplifiers that employ feedback resistors. The feedback resistors are specifically chosen to compensate for the differences in gain of the different phototube elements, i.e., the R×S pixels for each PMT that generate the R×S matrix of outputs. Each pair of a PMT and a corresponding preamplifier package may be tuned prior to, or at the time of, assembly of the detector units into the Anger camera by setting appropriate values for the feedback resistors.

Each R×S array of preamplifiers is configured to amplify each output from the R×S matrix of outputs from the corresponding PMT. The R×S amplified signals is provided to a signal conversion circuitry within each detector unit in the P×Q array of detector units. Within each Anger camera including a P×Q array of detector units, a P×Q array of signal conversion circuitries is provided. Thus, each output from the R×S matrix of outputs is amplified employing a corresponding R×S array of preamplifiers, and the R×S amplified outputs is provided from the corresponding R×S array of preamplifiers to the signal conversion circuitry.

Within each detector unit, the preamplifier package generates an R×S matrix of amplified signals from the R×S matrix of outputs from the PMT. The R×S matrix of amplified signals generated from the preamplifier package is provided to a signal conversion circuitry within the digital electronics module.

The signal conversion circuitry includes a P×Q array of row and column summer units and a P×Q array of A/D conversion units. Each detector unit includes a row and column summer unit and an A/D conversion unit. Each row and column summer unit includes R row summation circuits and S column summation circuits. Each row summation circuit performs a summation over columns for a given row. Each column summation circuit performs a summation over rows for a given column. As used herein, a "row summation" refers a summation over columns for a given row, and a "column summation" refers to a summation over rows for a given column. In one embodiment, each signal conversion circuitry can be embodied in a field programmable gate array (FPGA).

Each of the R row summation circuits numerically adds S amplified signals for one of the R rows within the P×Q matrix of amplified signals. Each of the R row summation circuits can be implemented as an analog adder (such as a summing amplifier) that employs S analog signals corresponding to a same row within the R×S matrix of amplified signals as inputs, and generate an output that is proportional to the sum of the magnitudes of the S analog signals employed as the inputs. The R row summation circuits generate R row summation signals corresponding to R different rows of the R×S matrix of amplified signals from the preamplifier package. Thus, each of the R row summation signals is proportional to the sum of all amplified signals originating from a corresponding row within the R×S matrix of outputs from the PMT within each detector unit.

Each of the S row summation circuits numerically adds R amplified signals for one of the S columns within the P×Q matrix of amplified signals. Each of the S column summation circuits can be implemented as an analog adder (such as a summing amplifier) that employs R analog signals corresponding to a same column within the R×S matrix of amplified signals as inputs, and generate an output that is proportional to the sum of the magnitudes of the R analog signals employed as the inputs. The S column summation circuits generate S column summation signals corresponding to S different columns of the R×S matrix of amplified signals from the preamplifier package. Each of the S column summation signals is proportional to the sum of all amplified outputs originating from a corresponding column within the R×S matrix of outputs from the PMT within each detector unit.

In one embodiment, a suspension mounting system can be employed for the P×Q array of row and column summer units. The suspension mounting system allows the P×Q array of row and column summer units to remain aligned with the PMT's during the coupling process while keeping the P×Q array of row and column summer units connected to the circuit boards embodying the P×Q array of preamplifier packages.

The R row summation signals and the S column summation signals are transmitted into an A/D conversion and signal discrimination unit. The signal processing that converts the R×S matrix of amplified signals to R+S summation signals can considerably simplify calculation especially when the values of R and S are large integers. For example, for R=S=8, 8×8 signals can be reduced to 8+8 signals.

Within each detector unit, the R row summation signals and the S column summation signals can be delayed via a delay line programmed with a preset delay time. For example, the delay time can be in a range from 100 nanoseconds to 400 nanoseconds. The delayed signals can also be transmitted into an A/D conversion and signal discrimination unit.

The A/D conversion and signal discrimination unit within each detector unit includes an A/D conversion unit and a signal discrimination unit. Each A/D conversion unit includes R+S analog-to-digital (A/D) converter circuits configured to convert the R row summation signals into R digitized row summation signals and the S column summation signals into S digitized column summation signals. As an illustrative example, the A/D conversion unit can be an A/D converter with a 10 bit pipeline.

The signal discrimination unit can be, for example, a simple threshold discriminator circuit (with hysteresis) that initiates the time integration of signals in the A/D conversion unit only when the magnitude of at least one signal among the R row summation signals and the S column summation signals (or a derived quantity measuring the overall magnitude of the R row summation signals and the S column summation signals) exceeds a predefined threshold.

Further, the signal discrimination unit within each detector unit is in communication with other signal discrimination units in other detector units such that if one of the signal discrimination units determines that a signal exceeding a predefined threshold is detected, that signal can be employed to trigger integration of signals (with the same preset delay time from the detection of the signal exceeding the predetermined threshold) in all of P×Q array of A/D conversion units. The signal discrimination unit is configured to trigger integration of signals for the time-integrated sums of the at least one row signal histogram and the at least one column signal histogram. The signal discrimination units thus enable discarding of spurious noise and initiation of the operation of the A/D conversion units only when a signal exceeding a predefined threshold is detected among the R row summation signals and the S column summation signals in one of the detector units.

The signal conversion circuitry in each detector unit is configured to generate a row signal histogram of R digitized row summation signals and a column signal histogram of S digitized column summation signals. As discussed above, each of the R row summation signals is proportional to a sum of all amplified signals originating from a corresponding row within the R×S matrix of outputs, and each of the S column summation signals is proportional to a sum of all amplified outputs originating from a corresponding column within the R×S matrix of outputs.

Figure 4:
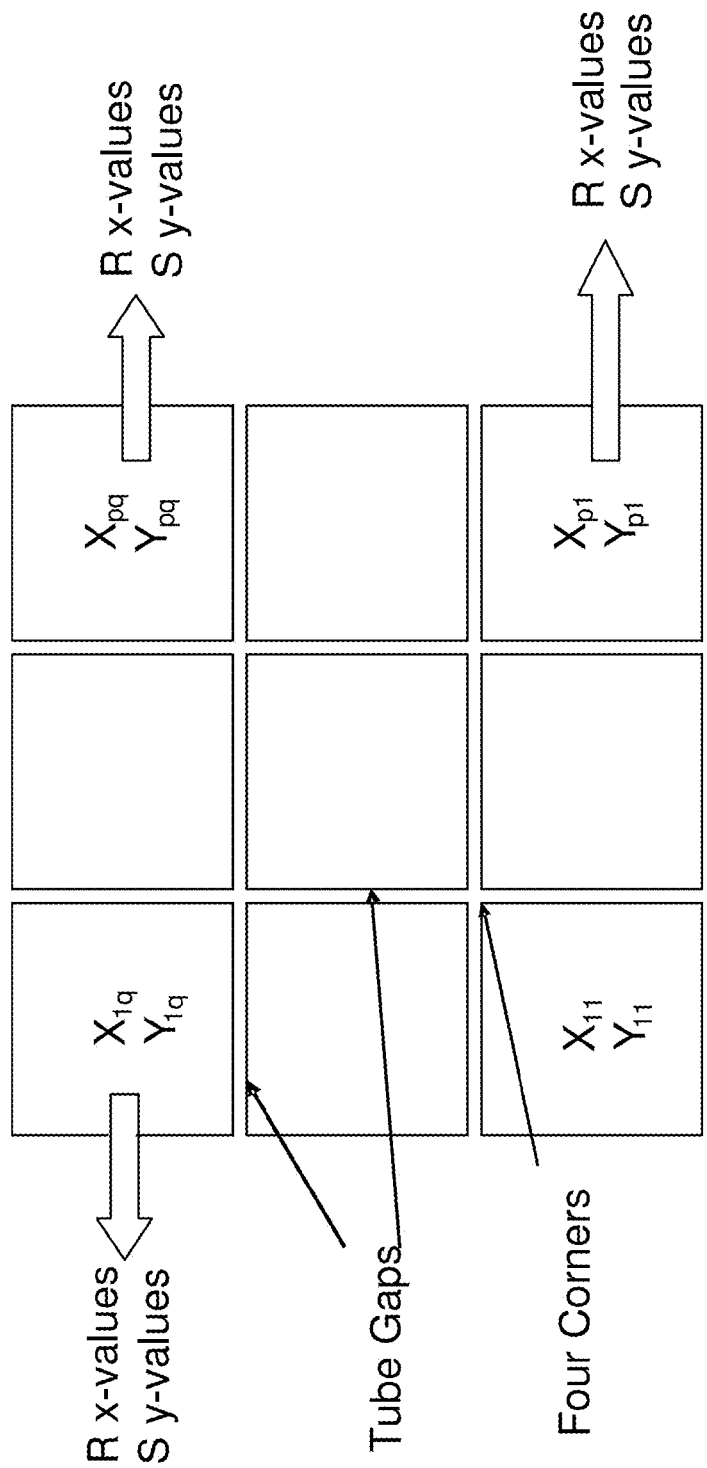
FIG. 4 is a schematic diagram illustrating outputs from a P×Q array of A/D conversion units according to an embodiment of the present disclosure.

Referring to FIG. 4, a schematic diagram illustrates outputs from a P×Q array of A/D conversion units. The R digitized row summation signals within a detector unit in the i-th row and in the j-th column can be represented as a vector $X_{ij}$ including R components. Each component in the vector $X_{ij}$ can be arranged in the order such that the position of each component of the vector $X_{ij}$ corresponds to the row position within the R×S matrix of outputs. For example, the first component within the vector $X_{ij}$ is proportional to the sum of all amplified signals originating from the first row within the R×S matrix of outputs, the second component within the vector $X_{ij}$ is proportional to the sum of all amplified signals originating from the second row within the R×S matrix of outputs, etc.

The S digitized column summation signals within a detector unit in the i-th row and in the j-th column can be represented as a vector $Y_{ij}$ including S components. Each component in the vector $Y_{ij}$ can be arranged in the order such that the position of each component of the vector $Y_{ij}$ corresponds to the column position within the R×S matrix of outputs. For example, the first component within the vector $Y_{ij}$ is proportional to the sum of all amplified signals originating from the first column within the R×S matrix of outputs, the second component within the vector $Y_{ij}$ is proportional to the sum of all amplified signals originating from the second column within the R×S matrix of outputs, etc. Thus, for each detector unit, two vectors are generated as the output signals from the P×Q array of A/D conversion units.

For an arbitrary combination of positive integers i and j selected such that i does not exceed P and j does not exceed Q, the vector $X_{ij}$ represents a row signal histogram of R row summation signals generated from the R×S amplified signals within a detector unit located within the i-th row and within the j-th column of the array of P×Q detector units, and the vector $Y_{ij}$ represents a column signal histogram of S column summation signals generated from the R×S amplified signals within a detector unit located within the i-th row and within the j-th column of the array of P×Q detector units.

In one embodiment, the signal discrimination unit triggers the integration of signals if a parameter value generated from any of the row signal histograms or any of the column signal histograms from the P×Q array of A/D conversion units exceeds a predefined threshold value. The integration of signals for the time-integrated sums of the row signal histograms and the column signal histograms can be triggered based on whether the parameter value derived from the row signal histograms and the column signal histograms exceeds a predefined threshold value.

Once the signal discrimination units generate a trigger signal upon detection of a signal exceeding the preset threshold, the row signal histogram of R digitized row summation signals and the column signal histogram of S digitized column summation signals within each detector unit are integrated over a preset time duration. The preset time duration can be, for example, in a range from 200 nanoseconds to 1,000 nanoseconds. In other words, each component of the vectors $X_{ij}$ and each component of the vector $Y_{ij}$ are integrated over time for each value of i and j, i.e., for each of the detector units.

In one embodiment, the integration of the row signal histogram of R digitized row summation signals and the column signal histogram of S digitized column summation signals can be performed employing a field programmable gate array (FPGA), which receives an output from the P×Q array of discriminator units in the form of a trigger signal, and integrates each of the R digitized row summation signals and the S digitized column summation signals over time. Each histogram is integrated over time component by component. Trigger signals to and from each of the P×Q A/D conversion and signal discrimination units are also required to synchronize the integration timing over the entire detector array including the P×Q detector units.

In a non-limiting illustrative example, an array of detector units can be configured such that the FPGA logic sets a global trigger signal high whenever a row or column signal exceeds the hardware discriminator threshold. All boards in the digital electronics module can use the global trigger signal to start timing. A programmable number of ticks (e.g., 1 tick can have a duration of about 50 nanoseconds) after this signal (typically 2 ticks), an integrator gate in the A/D conversion and signal discrimination unit can be released to start the hardware integration process in each of the P×Q detector units. After m ticks, the output of the integrator can be captured. The integer m is programmable, and can be about 12 in typical applications. This corresponds to 600 nanoseconds of integration time with the first 200 nanosecond providing a baseline signal. Thus, whenever any of the P×Q×(R+S) signals trigger the hardware of the Anger camera, P×Q×(R+S) of A/D conversion values along with a timestamp can be captured by the FPGA logic.

The time-integrated data generated from the P×Q array of A/D conversion and signal discrimination units is transmitted to a position calculation unit. The position calculation unit is configured to analyze P×Q of row signal histograms as integrated over time and P×Q of column signal histograms as integrated over time to identify the event location within the scintillator plate. For each of the P×Q array of detector units, the time-integrated sum of the corresponding row signal histogram and the time-integrated sum of the corresponding column signal histogram are analyzed. The event location refers to the location at which a neutron causes scintillation, i.e., the location at which a capture event and accompanying photoemission occur.

The position calculation unit can be embodied as a component of a circuit board, which is herein referred to as an Anger camera position calculation (ACPC) board. For example, the position calculation unit can be embodied as a field programmable gate array (FPGA). In addition to calculating the position of event locations, the position calculation unit can perform the task of rejecting events caused by gamma particles by analyzing the pattern and duration of detected events.

The output from the P×Q array of A/D conversion and signal discrimination unit includes P×Q×(R+S) values. P×Q×R time-integrated output values correspond to the time-integrated digitized row summation signals from the P×Q array of A/D conversion and signal discrimination unit, and P×Q×S time-integrated output values correspond to the time-integrated digitized column summation signals from the P×Q array of A/D conversion and signal discrimination unit.

In one embodiment, the P×Q array of PMT's can be arranged in a configuration of P rows and Q columns, and an R×S matrix of outputs can be generated from each PMT such that the R×S matrix includes R rows that are parallel to the row direction in the P×Q array of PMT's and S columns that are parallel to the column direction in the P×Q array of PMT's. In this case, the P×Q×R time-integrated digitized row summation signals can be further summed over different columns of P×Q arrays of PMT's. Specifically, for each given value i in a range from 1 to P and for each given value of k in a range from 1 to R, the k-th component of the R digitized row summation signals from each A/D conversion and signal discrimination unit (in a single detector unit) can be summed over the entire range of indices representing the changes in the column numbers in the P×Q array of PMT's, e.g., for the entire range of l between, and including, 1 and Q, corresponding to all of the PMT's within the i-th row of the P×Q array of PMT's. This summation reduces the P×Q×R time-integrated digitized row summation signals into P×R time-integrated digitized camera-row summation signals. Each of the time-integrated digitized camera-row summation signals is a time-integrated sum, i.e., a sum generated by integrating over time. This summation encompasses an entire row of pixels within the camera, i.e., a "camera-row," which extends across the entirety of the camera. Each time-integrated digitized camera-row summation signal corresponds to a time-integration of all amplified signals from A/D conversion and signal discrimination units along a same row among P×R different rows within the pixel array that are present within the Anger camera.

Likewise, the P×Q×S time-integrated digitized column summation signals can be further summed over different rows of P×Q arrays of PMT's. Specifically, for each given value j in a range from 1 to Q and for each given value of 1 in a range from 1 to S, the 1-th component of the S digitized column summation signals from each A/D conversion and signal discrimination unit (in a single detector unit) can be summed over the entire range of indices representing the changes in the row numbers in the P×Q array of PMT's, e.g., for the entire range of k between, and including, 1 and P, corresponding to all of the PMT's within the j-th row of the P×Q array of PMT's. This summation reduces the P×Q×S time-integrated digitized column summation signals into Q×S time-integrated digitized camera-column summation signals. Each of the time-integrated digitized camera-column summation signals is a time-integrated sum. This summation encompasses an entire column of pixels within the camera, i.e., a "camera-column," which extends across the entirety of the camera. Each time-integrated digitized camera-column summation signal corresponds to a time-integration of all amplified signals from A/D conversion and signal discrimination units along a same column among Q×S different columns within the pixel array that are present within the Anger camera.

The summation processes reduce the P×Q×R time-integrated digitized row summation signals into the P×R time-integrated digitized camera-row summation signals, and reduce the P×Q×S time-integrated digitized column summation signals into the Q×S time-integrated digitized camera-column summation signals.

Figure 5:
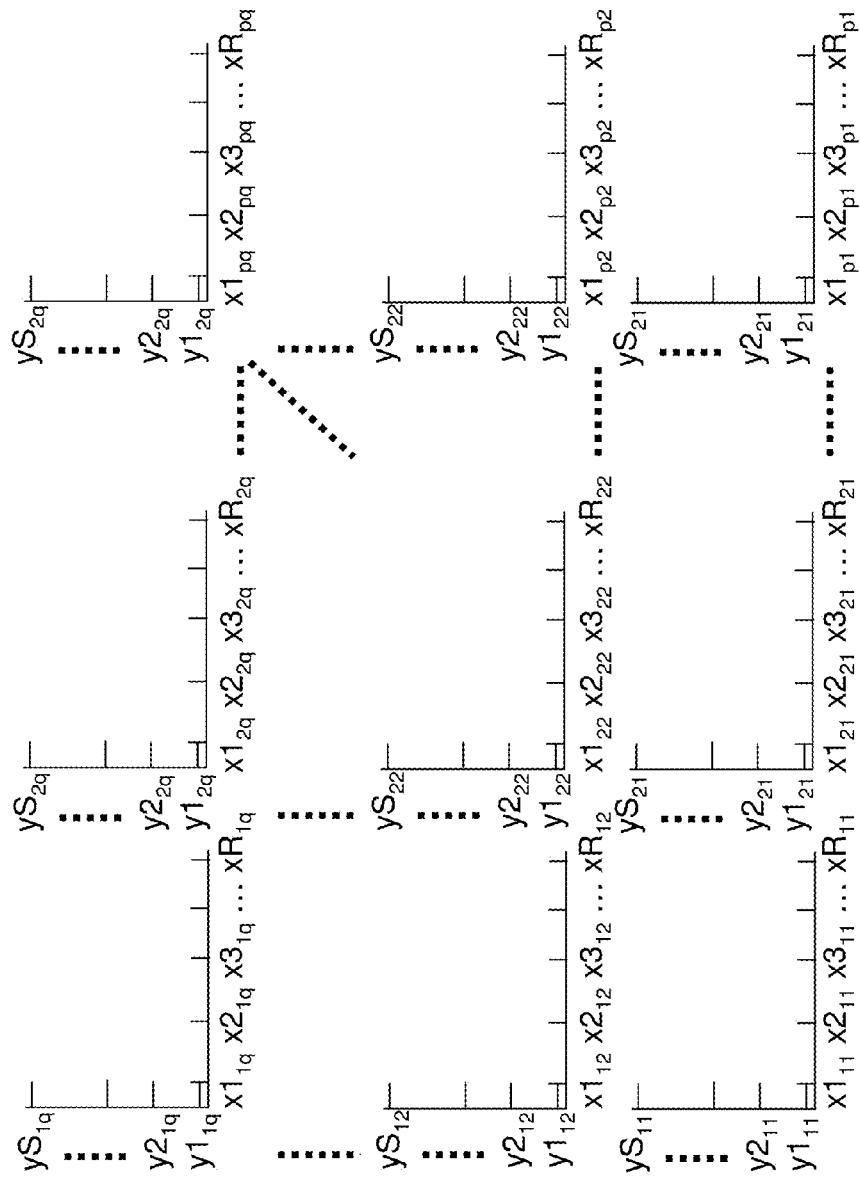
FIG. 5 is a schematic illustration of position calculation for an Anger camera including a P×Q array of photomultiplier tubes according to an embodiment of the present disclosure.

FIG. 5 illustrates the P×Q×R time-integrated digitized row summation signals and the P×Q×S time-integrated digitized column summation signals. The horizontal direction refers to the row directions of the P×Q array of PMT's, which is the same as the row direction of the R×S array of outputs from each PMT. The vertical direction refers to the column direction of the P×Q array of PMT's, which is the same as the column direction of the R×S array of outputs from each PMT.

Each value of the P×Q×R time-integrated digitized row summation signals is represented by $xk_{ij}$, in which i represents the row number of the corresponding PMT, j represents the column number of the corresponding PMT, and k represents the row number (within the R×S array of outputs within the corresponding PMT) for which the row summation is performed. As described above, the summation that generates each time-integrated digitized row summation signals is performed over all values of the column indices within the corresponding PMT, i.e., from 1 to S, for a given row within the R×S array. Each summation that generates the P×R time-integrated digitized camera-row summation signals is performed for all possible index values of j for any given pair of indices i and k. Each of the P×R time-integrated digitized camera-row summation signals can be characterized by a pair of indices i and k.

Each value of the P×Q×S time-integrated digitized column summation signals is represented by $yl_{ij}$, in which i represents the row number of the corresponding PMT, j represents the column number of the corresponding PMT, and 1 represents the column number (within the R×S array of outputs within the corresponding PMT) for which the column summation is performed. As described above, the summation that generates each time-integrated digitized column summation signals is performed over all values of the row indices within the corresponding PMT, i.e., from 1 to R, for a given column within the R×S array. Each summation that generates the Q×S time-integrated digitized camera-column summation signals is performed for all possible index values of i for any given pair of indices j and 1. Each of the Q×S time-integrated digitized camera-column summation signals can be characterized by a pair of indices j and 1.

Once the position calculation unit generates the P×R time-integrated digitized camera-row summation signals and the Q×S time-integrated digitized camera-column summation signals, the position calculation unit can analyze the distribution of the P×R time-integrated digitized camera-row summation signals as a function of camera-row locations and the distribution of the Q×S time-integrated digitized camera-column summation signals as a function of camera-column locations. In general, P×R camera-rows corresponding to P×R distinct coordinate along the row direction and Q×S camera-columns corresponding to Q×S distinct coordinate along the column direction are present within an Anger camera employing a P×Q array of detector units and employing R×S array of pixels for each PMT.

The P×R time-integrated digitized camera-row summation signals are provided as a distribution of time-integrated sums derived from P×Q sets of R row summation signals. This distribution of time-integrated sums is herein referred to as first time-integrated sums. The Q×S time-integrated digitized camera-column summation signals are provided as a distribution of second time-integrated sums derived from P×Q sets of S column summation signals. This distribution of time-integrated sums is herein referred to as second time-integrated sums in order to distinguish from the first time-integrated sums. The distribution of first time-integrated sums and the distribution of second time-integrated sums are analyzed to identify an event location in the at least one scintillator plate at which a neutron causes scintillation.

The distribution of first time-integrated sums includes P×R first time-integrated sums, which are P×R time-integrated digitized camera-row summation signals. The distribution of second time-integrated sums includes Q×S second time-integrated sums, which are Q×S time-integrated digitized camera-column summation signals.

The position calculation unit can be configured to fit the P×R first time-integrated sums with a row fitting function and to identify a row coordinate of the event location, and to fit the Q×S second time-integrated sums with a column fitting function and to identify a column coordinate of the event location. For this purpose, the P×R first time-integrated sums can be plotted, for example, on a Cartesian axis such as an x-axis, and the Q×S second time-integrated sums can be plotted, for example, on another Cartesian axis such as a y-axis. In one embodiment, each of the row fitting function and the column fitting function can have a functional form that strictly decreases with distance from a maximum value point on the corresponding axis. In one embodiment, the functional form can include at least one term that is proportional to a Gaussian function.

The fitting of the P×R first time-integrated sums and the fitting of the Q×S second time-integrated sums can be performed employing any fitting method for fitting a distribution (which can be represented by a histogram) with a function. For example, the fitting can be performed employing a least square fitting method.

Figure 6:
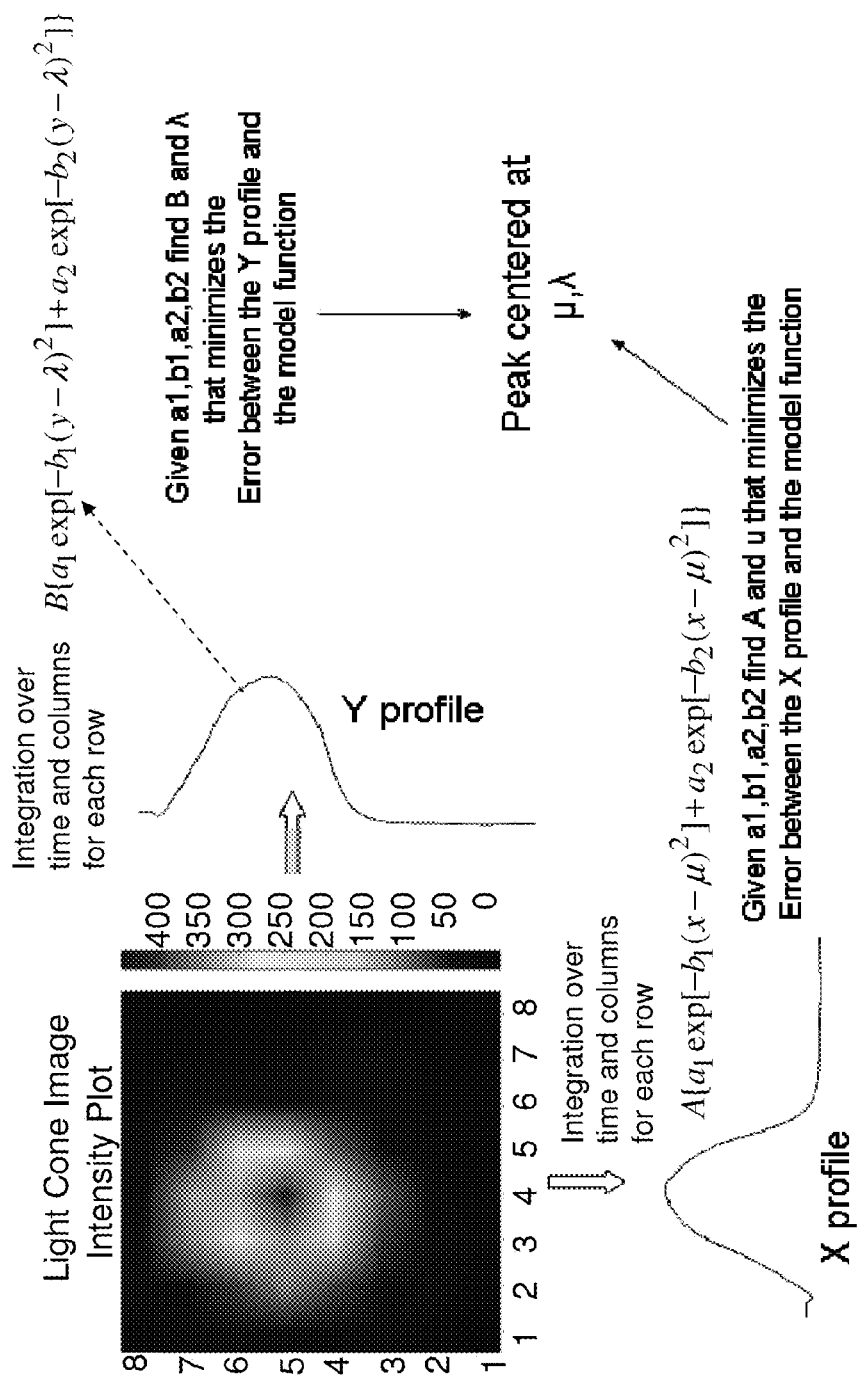
FIG. 6 is a schematic illustration of position calculation according to an embodiment of the present disclosure.

Referring to FIG. 6, the P×R time-integrated digitized camera-row summation signals can be represented in the order that replicates the physical order of camera rows within the Anger camera to generate a first histogram. Likewise, the Q×S time-integrated digitized camera-column summation signals can be represented in the order that replicates the physical order of camera columns within the Anger camera to generate a second histogram. For the sake of simplicity, FIG. 6 is shown for a case in which P=Q=2, and R=S=4. The first histogram for the 8 (i.e., P×R) time-integrated digitized camera-row summation signals is plotted as an "X profile." The second histogram for the 8 (i.e., Q×S) time-integrated digitized camera-column summation signals plotted as a "Y-profile." The first histogram represents a first distribution of time-integrated sums derived from P×Q sets of R row summation signals. The second histogram represents a second distribution of time-integrated sums derived from the P×Q sets of S column summation signals.

The first distribution of time-integrated sums can be plotted on the x-axis as the first histogram, and is fitted with a first row fitting function. In a non-limiting illustrative example, the row fitting function can have the functional form of:

$$A\{a_1\exp[-b_1(x-\mu)^2]+a_2\exp[-b_2(x-\mu)^2]\},$$

in which A is a proportionality constant, $a_1$, $a_2$, $b_1$, and $b_2$ are fitting parameters that affect the shape of the fitting function (i.e., a model function), and $\mu$ is a parameter that laterally shifts the fitting function along the direction corresponding to the direction of the row number changes among the P×R camera-row locations.

The second distribution of time-integrated sums can be plotted on the y-axis as the second histogram, and is fitted with a second row fitting function. In a non-limiting illustrative example, the column fitting function can have the functional form of:

$$B\{a_1\exp[-b_1(y-\lambda)^2]+a_2\exp[-b_2(y-\lambda)^2]\},$$

in which B is a proportionality constant, $a_1$, $a_2$, $b_1$, and $b_2$ are the same fitting parameters as for the row fitting function, and X is a parameter that laterally shifts the fitting function along the direction corresponding to the direction of the column number changes among the Q×S camera-column locations.

The row fitting function and the column fitting function can be fitted simultaneously to determine the values for the parameters $\mu$ is $\lambda$, which determines the event location within the scintillator plate. Comparison between the light cone image intensity plot and the locations of the peaks as determined by the measured values for $\mu$ is $\lambda$ show a good agreement between the center of the light cone (which corresponds to the event location) and the event location as calculated employing the method of the present disclosure. While a set of fitting functions each including two Gaussian functions has been illustrated herein, use of other fitting functions having different functional dependence on the distance from an event location is expressly contemplated herein.

While the invention has been described in terms of specific embodiments, it is evident in view of the foregoing description that numerous alternatives, modifications and variations will be apparent to those skilled in the art. Each of the various embodiments of the present disclosure can be implemented alone, or in combination with any other embodiments of the present disclosure unless expressly disclosed otherwise or otherwise impossible as would be known to one of ordinary skill in the art. Accordingly, the invention is intended to encompass all such alternatives, modifications and variations which fall within the scope and spirit of the invention and the following claims.

What is claimed is:

1. A neutron camera comprising:
   a scintillator plate;
   at least one detector unit, wherein each of said at least one detector unit comprises:
      a photomultiplier tube located on a back side of said scintillator plate and comprising an R×S matrix of outputs, wherein R and S are integers greater than 1;
      an R×S array of preamplifiers configured to amplify each output from said R×S matrix of outputs and to generate R×S amplified signals; and
      a signal conversion circuitry configured to generate a set of R row summation signals and a set of S column summation signals from said R×S amplified signals; and
   a position calculation unit configured to analyze a distribution of first time-integrated sums derived from said set of R row summation signals and a distribution of second time-integrated sums derived from said set of S column summation signals to identify an event location in said scintillator plate at which a neutron causes scintillation.

2. The neutron camera of claim 1, wherein said at least one detector unit is a P×Q array of detector units, wherein P and Q are integers greater than 1.

3. The neutron camera of claim 2, wherein said distribution of first time-integrated sums includes P×R first time-integrated sums, and said distribution of second time-integrated sums includes Q×S second time-integrated sums.

4. The neutron camera of claim 3, wherein said position calculation unit is configured to fit said P×R first time-integrated sums with a row fitting function and to identify a row coordinate of said event location, and to fit said Q×S second time-integrated sums with a column fitting function and to identify a column coordinate of said event location.

5. The neutron camera of claim 4, wherein each of said row fitting function and said column fitting function has a functional form that strictly decreases with distance from a maximum value point.

6. The neutron camera of claim 5, wherein said functional form includes at least one term that is proportional to a Gaussian function.

7. The neutron camera of claim 4, wherein said fitting of said P×R first time-integrated sums and said fitting of said Q×S second time-integrated sums is performed employing a least square fitting method.

8. The neutron camera of claim 1, wherein each of said at least one signal conversion circuitry is embodied in a field programmable gate array (FPGA), and said position calculation unit is embodied in another field programmable gate array (FPGA).

9. The neutron camera of claim 1, wherein each of said R row summation signals is proportional to a sum of all amplified signals originating from a corresponding row within said R×S matrix of outputs, and each of said S column summation signals is proportional to a sum of all amplified outputs originating from a corresponding column within said R×S matrix of outputs.

10. The neutron camera of claim 9, wherein said detector unit further comprises R+S analog-to-digital (AD) converter circuits configured to convert said R row summation signals into R digitized row summation signals and said S column summation signals into S digitized column summation signals.

11. The neutron camera of claim 1, wherein said at least one detector unit further comprises a signal discrimination unit configured to trigger integration of said set of R row summation signals and said set of S column summation signals.

12. The neutron camera of claim 11, wherein said signal discrimination unit triggers said integration of signals if a parameter value generated from said set of R row summation signals and said set of S column summation signals exceeds a predefined threshold value.

13. A method of operating a neutron camera comprising:
   providing a neutron camera including a scintillator plate and at least one detector unit, wherein each of said at least one detector unit comprises at least a photomultiplier tube located on a back side of said scintillator plate and comprising an R×S matrix of outputs, and an R×S array of preamplifiers configured to amplify each output from said R×S matrix of outputs and to generate R×S amplified signals, wherein R and S are integers greater than 1;

generating, for each of said at least one detector unit, a set of R row summation signals and a set of S column summation signals; and determining an event location in said scintillator plate at which a neutron causes scintillation by analyzing a distribution of first time-integrated sums derived from said at least one set of R row summation signals and a distribution of second time-integrated sums derived from said at least one set of S column summation signals.

14. The method of claim 13, wherein said at least one detector unit is a P×Q array of detector units, wherein P and Q are integers greater than 1.

15. The method of claim 13, wherein said determining of said event location comprises:
fitting said distribution of first time-integrated sums with a row fitting function and to identify a row coordinate of said event location; and
fitting said distribution of second time-integrated sums with a column fitting function and to identify a column coordinate of said event location.

16. The method of claim 15, wherein each of said row fitting function and said column fitting function has a functional form that strictly decreases with distance from a maximum value point.

17. The method of claim 13, wherein each of said R row summation signals is proportional to a sum of all amplified signals originating from a corresponding row within said R×S matrix of outputs, and each of said S column summation signals is proportional to a sum of all amplified outputs originating from a corresponding column within said R×S matrix of outputs.

18. The method of claim 17, further comprising:
converting each set of R row summation signals into a set of R digitized row summation signals; and
converting each set of S column summation signals into a set of S digitized column summation signals.

19. The method of claim 18, further comprising triggering integration of signals for said first and second time-integrated sums based on whether a parameter value generated from said at least one set of R row summation signals and said at least one set of S column summation signals exceeds a predefined threshold value.

* * * * *